United States Patent Office 3,736,133
Patented May 29, 1973

3,736,133
TRANSPARENT INK ABSORBENT LACQUERS
John W. Weigl, Webster, and Joseph Mammino and Alan R. Amidon, Penfield, N.Y., assignors to Xerox Corporation, Rochester, N.Y.
No Drawing. Filed June 21, 1971, Ser. No. 155,361
Int. Cl. G03g *5/02;* B41n *1/00*
U.S. Cl. 96—1.5                                                 5 Claims

ABSTRACT OF THE DISCLOSURE

A method for forming ink absorbent transparenices is provided comprising applying a lacquer to a polymeric film transparency, said lacquer comprising a substantially transparent resinous binder pigmented with an ink absorptive pigment exhibiting substantially the same refractive index as that of the binder, and drying said lacquer on said transparency.

---

This invention relates to methods of forming improved transparencies for use in image projection. More particularly, this invention relates to film transparencies coated with a pigmented transparent ink absorptive lacquer.

Many printing and reproduction systems employ stable, relatively non-evaporating, non-oxidizable inks for imaging purposes. These inks dry by absorption in the cellulose fibers and in the sizing which may be present in the papers or fabrics which are being printed upon.

In the preparation of polymeric film transparencies employing such polymeric film bases as Mylar, polystyrene, cellulose acetate, cellophane, polypropylene and the like, absorptive drying does not occur and the resulting images formed on these films remain indefinitely subject to smudging and obliteration.

Ink absorptive lacquers have heretofore been applied to the transparent polymeric substrate to impart absorptive drying capabilities thereto. Unfortunately, all such absorptive lacquer coatings previously employed were pigmented with materials such as zinc oxide, titanium dioxide, calcium carbonate, starch, clay and the like, whose refractive indices did not match those of the lacquer binder, resulting in light scattering and the formation of gray backgrounds upon projection of the resulting imaged transparency.

Accordingly, it is an object of the present invention to provide a transparent, pigmented lacquer capable of absorbing and fixing relatively non-volatile inks on film transparenices.

It is another object to provide transparencies capable of receiving ink patterns and fixing said patterns by ink absorption.

It is still another object to provide transparent lacquers for transparent film bases, which will enable relatively non-volatile liquid inks to be printed thereon by any convenient printing method, and be fixed by absorptive drying.

These as well as other objects are accomplished by the present invention which provides methods for forming ink absorbent transparencies comprising applying a lacquer to a polymeric film transparency, said lacquer comprising a substantially transparent resinous binder pigmented with an ink absorptive pigment exhibiting substantially the same refractive index as that of the binder, and drying said lacquer on said transparency.

The transparent lacquers of the present invention are characterized by the fact that they contain an ink-absorptive pigment with high effective surface area which has a refractive index closely matching that of the resinous binder in which it is to be used.

Although not wishing to be bound by any theory or mechanism, and recognizing that the general theory of light scattering in pigment dispersions is very complex, a generalized light scattering curve has been derived which relates $C_{sca}$, the scattering cross section, to average particle diameter D, wavelength $\lambda$, the refractive indices of the resin matrix $n_m$ and of the particles $n_p$, and their ratio, $m = n_p/n_m$. This has been described, for example, in Light Scattering by Small Particles, H. C. Van de Hulst, John Wiley & Sons, Inc., New York (1957).

In general as the parameter, $$P = \left(\frac{n_m D}{\lambda}\right)\left[\frac{m-1}{m+2}\right]^2$$

approaches zero, the scattering cross section or efficiency ($C_{sca}$) of the dispersion approaches zero, and the medium becomes substantially transparent. The factors $n_m$, D, and $n_p$ cannot be altered sufficiently to control transparency. Therefore, according to the present invention, a pair of values of $n_p$ and $n_m$ have been selected, such as to make them as nearly equal as possible, so that $$m = n_p/n_m = 1.00 \pm 0.05$$

and preferably $\pm 0.01$.

In the region where P approaches zero, the scattering cross section, $C_{sca}$, takes the form:

$$C_{sca} = \left(\frac{2\pi}{\lambda}\right)^4 \frac{V^2}{6\pi}[m^2-1]^2$$

V being the volume of a particle. From this relationship, it can be estimated that through the present invention the scattering cross section can be held to less than 1% of the maximum which could be expected from a suspension of an ink-absorbing pigment in which the refractive indices are poorly matched (taking as a typical example $n_p = 2.00$ and $n_m = 1.50$).

It has been found that significant improvement in the transparency of pigmented plastic layers can be achieved in accordance with the present invention by selecting pigments and resin binders with closely matching refractive indices.

A wide range of resins are available, with refractive indices ranging generally from 1.40 to 1.70. Thus, a suitably absorptive pigment, having a refractive index within this range is first selected. Then, a resin binder having a suitably matching refractive index is selected. Many of the absorptive pigments fall outside this range; for example, ZnO has a refractive index of 2.02, and $TiO_2$ of 2.6–2.9. However, certain other absorptive pigments have refractive indices which can readily be matched by resin binders, notably hydrated magnesium silicate (1.50), silica (1.53–1.54), and $BaSO_4$ (1.64). The selection of suitable resin binders can then be made, according to the present invention, by matching the refractive index of the resin to that of the pigment within about $\pm 0.05$ refractive index units, and preferably within about $\pm 0.01$ unit. Typical combinations which meet this criterion include:

Hydrated magnesium silicate (1.50) with:

Poly(cyclohexyl methacrylate) (1.506), poly(methyl methacrylate) (1.49), poly(allyl diglycol carbonate) (1.50), cellulose acetate (1.49–1.50), cellulose nitrate (1.49–1.51), various ionomer resins (1.51), poly(butylene) (1.50), poly(vinyl formal) (1.50), and various linear aliphatic polyesters (1.50–1.51).

Silica aerogel (1.53–1.54) with:

Copolymers of styrene with methyl methacrylate (1.53–1.55), aromatic polyesters (1.53–1.55), copolymers of styrene with butadiene (1.52–1.55) and poly(furfuryl methacrylate) (1.54).

Barium sulfate (1.64) with:

Poly(fluorenyl methacrylate) (1.63), poly($\alpha$-naphthyl methacrylate) (1.64), poly($\beta$-naphthyl methacrylate) (1.63), and poly(N-vinyl carbazole) (1.68).

Among the suitable pigments, hydrated magnesium silicate of the chrysotile form is preferred because of its exceptionally high absorptive power for inks and because its refractive index matches that of an exceptionally wide variety of lacquer resins. Useful pigments of this type are available, for example, under the trademark "AVIBEST-C" manufactured by FMC Corporation. However, silica pigments, other silicates, and barium sulfate all have practical uses when matched to appropriate binders.

The amount of absorptive pigment in the lacquer is not considered narrowly critical and can vary widely from about 3 to about 20% by weight. Higher or lower pigment loadings can be employed, if desired, depending upon the nature of the ink to be employed in conjunction therewith.

The lacquers of the present invention can be easily prepared by admixing the absorptive pigment with a suitable binder resin. The lacquer can be applied to the transparency by any conventional application means. For example, the lacquer can be heated into a molten condition and applied to the transparency by roller coating, extrusion coating or like techniques. If desired, a solvent for the resin binder can be added to form a lacquer solution which can be applied to the transparency by spraying, painting, roller coating and the like. The lacquer solution can also be solution cast into a self-supporting film. A plasticizer can also be added to the lacquer, if desired, to improve ink fixation. Preferably, the plasticizer employed corresponds with the plasticizer or solvent employed in the ink composition.

A lacquer film of from about 1 to 10 microns thick and most preferably from about 3 to about 5 microns thick can be applied to the transparency. Once the lacquer film is applied to the transparency, it is permitted to dry to a tack free film. Drying can be hastened, if desired, by heating the transparency such as in a forced air dryer for a sufficient period to obtain a tack free film.

A wide range of solvents can be employed to form the above-described lacquer solutions. Any solvent for the resin binder can be employed. The choice of solvent will depend, of course, upon the particular resin employed. Typical solvents which can be employed which, for example, toluene, benzene, tetrahydrofuran, methyl ethyl ketone, methyl isopropyl ketone and the like.

For certain applications, the transparent binder resin can be itself photoconductive, or it can contain a photoconductive solute, or additives or sensitizers to render it photoconductive. It can also be dyed to confer a desirable color, or to alter its photosensitivity when photoconductive. Poly(N-vinyl carbazole) is a well known photoconductor, which can be sensitized in known manner by dyes and electron acceptors. Various classes of photoconductive solutes which can be dissolved in binders have been disclosed e.g., by Bethe in U.S. 3,073,479, Klüpfel et al. in U.S. 3,097,095. Neugebauer et al. in U.S. 3,112,197 and U.S. 3,206,306, Hoegl in U.S. 3,287,120, Tomanek in U.S. 3,391,014. The charge transfer sensitization of various aromatic binder resins is disclosed in a series of patents by Mammino (U.S. 3,408,182 to 190), the pertinent disclosures of which are incorporated herein by reference.

The ink absorptive transparencies of the present invention can be employed with any liquid ink composition and will effect absorptive drying thereof upon formation of the inked image thereon. The inked image can be drawn directly upon the transparency or can be formed thereon or transferred thereto by conventional reproduction techniques.

Illustrative reproduction techniques involving use of liquid inks which can be employed in conjunction with the absorptive transparencies of the present invention are, for example, lithography and electrophotography. As employed herein, the term "electrophotography" is intended to encompass the formation of images on either an insulating or photoresponsive surface by electrostatic attraction, wherein said images are either directly visible or can be rendered visible by development.

The formation of an electrostatic latent image on a photoresponsive surface such as, for example, a vitreous or amorphous selenium coating on a metal base or a layer of a photoconductive pigment in a suitable insulating binder is well known in the art and is described, for example, in U.S. 2,297,691. Any surface, however, which is capable of receiving and holding a charge pattern for a short period of time can be suitably employed. Thus, if desired, the electrostatic latent image can be formed on even an insulating medium by charge transfer between at least two electrodes. This process is known as electrography and is well known in the art. Many times, it is desirable to transfer the electrostatic latent image from a photoconductive or insulating surface to another insulating surface. This transfer process has been termed "TESI," an acronym for Transfer of ElectroStatic Images. This transfer process is advantageous in that it permits a delicate photoreceptor to be used solely to record the electrostatic image, leaving the development, transfer and cleaning steps to take place on a more rugged insulating surface. A more detailed description of electrography and TESI can be found in British Pat. No. 734,909 to C. F. Carlson and U.S. Pats. 2,825,814; 2,833,648; 2,934,649 and 2,937,943 to L. E. Walkup. Also, see "Xerography and Related Processes," Dissauer and Clark, The Focal Press (1965).

Once the electrostatic latent image is formed, it can be developed by any of many known techniques for liquid development. For example, electrophoretic development techniques such as those described in U.S. 2,892,709 and U.S. 2,913,353 can be employed. Similarly, polar ink development as described in U.S. 3,084,043 can be advantageously employed. Colored or black and white images can be formed directly on the transparencies of the present invention employing photoelectrophoretic techniques as described in U.S. 3,383,993; U.S. 3,384,488; U.S. 3,384,565 and U.S. 3,384,566.

The ink absorptive transparencies of the present invention can be employed to receive and fix developed images which have been formed and developed by the methods described hereinabove and then transferred to said transparencies. Advantageously, however, image formation and development can occur directly on the transparency thereby enabling the use of only one substrate and greatly simplifying the reproduction process. For example, an ink absorptive transparency of the present invention can be employed as the insulating surface for receiving electrographic recordings or TESI patterns which can then be developed by conventional liquid development techniques. The developed image on the transparency will undergo absorptive drying in accordance with the present invention. Alternatively, a transparency can be coated with a lacquer containing both the absorptive pigments of the present invention and transparent photoconductive pigments in a suitable binder resin to form a photoresponsive, absorptive transparency. Such a transparency can be charged, imaged and developed by the techniques described hereinabove and the developed images will undergo absorptive drying in accordance with the present invention. The absorptive pigment can thus be incorporated into a photoconductive coating or in a separate overcoating. If the absorptive pigment is incorporated in the photoconductive coating, the resin binder employed must, of course, be one having substantially the same refractive index as the pigment.

The following examples further define, describe and compare methods of preparing the ink absorptive transparencies of the present invention and of utilizing them to receive and fix images. Parts and percentages are by weight unless otherwise indicated.

EXAMPLE 1

A Lexan polycarbonate sheet (General Electric Co., Plastics Dept.), 5 mils in thickness, is employed as the film base for a transparency. The sheet is coated with a 3–5 micron layer of a dispersion of 2 grams of a microcrystalline hydrated magnesium silicate (AVIBEST-C manufactured by FMC Corporation, New York, N.Y.) and 20 grams of a polyester resin (Vitel PE–200 manufactured by Goodyear Tire and Rubber Company, Akron, Ohio) in 80 grams of toluene. The sheet is dried in a forced air oven at 50° C. for 10 minutes. After drying the sheet is tack free.

Bruning Premium zinc oxide paper is employed as a photoreceptor and is charged, imaged and developed in the manner described in U.S. 3,084,043. The composition of the liquid developer employed is:

| | Percent |
|---|---|
| Butyl benzyl phthalate | 33.2 |
| Triethylene glycol dicaprylate | 22.2 |
| Resinated carbon black dry dispersion (Microlith CT Black, manufactured by CIBA Corporation) | 44.3 |
| Nigrosine SSJJ dye (manufactured by American Cyanamid) | 0.3 |

The developed image is transferred to the coated transparency which is then heated to 75° C. for about 15 seconds to facilitate absorptive drying. Thereafter, the image on the transparency is essentially non-smudging.

EXAMPLE 2

A Mylar film, 2 mils in thickness, is employed as the film base for a transparency. The film is coated with a dispersion of 2 grams of AVIBEST-C, 20 grams of Vitel PE–200 polyester resin and 8 grams of benzyl butyl phthalate plasticizer in 80 grams of toluene. The coated film is forced air dried at 100° F. for one hour.

Bruning Premium zinc oxide paper is employed as a photoreceptor and is charged, imaged and developed in the manner described in U.S. 3,084,043. The composition of the liquid developer was:

| | Grams |
|---|---|
| Irgacet Black RL (manufactured by Geigy Chemical Corporation) | 4.0 |
| Benzyl butyl phthalate | 25.0 |
| Thixcin R (manufactured by Baker Castor Oil Company) | 0.5 |

The developed image is transferred to the coated transparency and is found to be dry to the touch in about one minute.

EXAMPLE 3

A Mylar film, 2 mils in thickness, is employed as the film base for a transparent TESI recording layer. The film is coated with an 8 micron coating comprising 3% Cab-O-Sil (a silica aerogel manufactured by Cabot Corporation) in Pliolite S–5B, a styrene-butadiene copolymer (manufactured by Goodyear Chemical Co.).

The resulting TESI recording layer is charged to +350 volts by contact charge transfer from a metal electrode in the shape of the character "A" (at 500 volts). The image thus produced is developed in the same manner described in Example 2. The developed image is dry to the touch.

EXAMPLE 4

Employing photoelectrophoretic imaging apparatus of the type described in U.S. 3,383,993 to Shu-Hsiung Yeh, a suspension is prepared comprising equal amounts of Watchung Red B, Algol Yellow G.C. and Monolite Fast Blue G.S. in Sohio 3454 odorless solvent (a kerosene fraction available from Standard Oil Company of Ohio). The total pigment concentration is about 7% by weight. This mixture is coated on the NESA glass substrate of the above-described apparatus. The NESA glass surface is connected in series with a switch, a potential source and the conductive center of a roller having a blocking electrode coating of bartya paper on its surface. The roller is about 2.5″ in diameter and is moved across the plate surface at about 1.45 centimeters per second. The plate employed is about 3″ square and is exposed with a light intensity of 1800 foot candles. The magnitude of the applied potential is −2500 volts. The exposure is made with a 3200° K. color temperature lamp. A Kodachrome color transparency is placed between the light source and the NESA glass substrate so that a stored image is projected onto the photosensitive pigment mixture thereon as the roller moves across the surface of the glass. After the roller passes over the substrate an excellent quality substrative three-color image is left behind on the glass.

The resulting three-color image is transferred to a coated Mylar transparency of the type described in Example 2 and the resulting transparency is found to be dry to the touch in about one minute.

EXAMPLE 5

A polycarbonate sheet, 5 mils in thickness, is employed as the film base for a transparency. The sheet is coated with a 5 micron layer of a photoconductive dispersion comprising 2 grams of AVIBEST-C, 20 grams of Vitel PE–200 polyester resin and 20 grams of 2-phenyl-4-diphenylidene-oxazolone (melting point 183° C.) in 80 grams of toluene. The coated film is forced air dried at 100° F. for one hour to remove the solvent and form a tack free transparent sheet.

The resulting transparent sheet is charged, imaged and developed in the manner described in U.S. 3,084,043. The liquid ink composition employed is identical to that employed in Example 1. Upon application of the liquid ink to the electrostatic latent image formed on the transparency, the developed image is dry to the touch after heating to 75° C. for 15 seconds.

EXAMPLE 6

Employing the procedure described in Example 5, a 5 micron layer of a photoconductive dispersion is applied to a polycarbonate sheet. The dispersion contains 2 grams of AVIBEST-C, 20 grams of Vitel PE–200 polyester resin and 20 grams of an organic photoconductive compound having the structural formula:

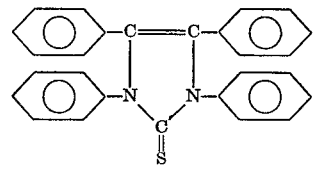

in 80 grams of toluene. The solvent is evaporated from the sheet in a forced air oven at 100° F. for one hour forming a tack free transparent sheet.

The photoconductive ink absorptive transparency is charged, imaged and developed as described in U.S. 3,084,043 employing the liquid ink composition of Example 2. The developed image is dry to the touch.

EXAMPLE 7

A Mylar film, 2 mils in thickness, is employed as the film base for a transparency. The film is coated with a solution of 1 gram of photoconductive 1,3,5-triphenyl-pyrazoline having the structural formula:

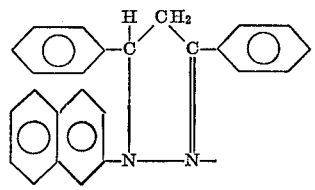

and 1 gram of resin-modified maleic acid resin (Beckacite K 105 manufactured by Reichold-Chemie Aktiengesellschaft, Hamburg, Germany) dissolved in 30 cc. of benzene. About 15 cc. of this solution is evenly applied to the Mylar film. After evaporation of the solvent, a firmly adherent transparent, photoconductive coating remains on the film. Thereafter, the resulting coated film is over-coated with the absorptive pigment dispersion described in Example 2. The resulting film is forced air dried at 100° F. for one hour.

The film is then charged, imaged and developed in the manner described in U.S. 3,084,043, employing the liquid developer described in Example 2. The developed image on the transparency is dry to the touch.

EXAMPLE 8

A photoconductive layer is formed on 2 mil Mylar film by coating thereon a solution of 10 grams of the photoconductive polymer, polyvinyl carbazole, and 0.1 gram of the sensitizer, 2,4,7-trinitro-9-fluorenone in 150 ml. of benzene and allowing the coating to dry. The solution is applied to the film to produce a glossy transparent film of dry thickness equal to about 20 microns. Thereafter, the film is overcoated as described in Example 7.

The resulting film is charged, imaged and developed as described in Example 7 and the developed image on the transparency is dry to the touch.

EXAMPLE 9

A transparent pressure sensitive adhesive tape (Scotch tape manufactured by Minnesota Mining and Manufacturing Co.) is top-coated on the non-adhesive side with the transparent ink absorptive coating composition described in Example 1. The coating is rendered tack free by drying in a forced air oven at 50° C. for 10 minutes.

A rubber stamp having a series of raised rubber numerals thereon is inked with a rubber stamp pad ink having the composition:

| | Parts |
|---|---|
| Methyl violet | 35 |
| Glycerine | 50 |
| Ethylene glycol | 35 |

The inked stamp is pressed against the coated non-adhesive side of the adhesive tape leaving an imprint of the numerals thereon. The imprint is dry to the touch.

EXAMPLE 10

A transparency adapted for use with an overhead projector is prepared from a Lexan polycarbonate sheet, 5 mils in thickness. A schematic flow sheet is imprinted upon the transparency, thereafter, the transparency is overcoated with the ink absorptive coating described in Example 1. The transparency is dried in a forced air oven at 50° C. for 10 minutes. After drying, the sheet is tack free.

While in use in an overhead projector, notations are made directly upon the transparency with a ball point pen containing an ink having the following composition:

| | Parts |
|---|---|
| 17% fumerated rosin | 50 |
| Ethylene glycol | 35 |
| Urea | 15 |
| Calcium lithol pigment (Pigment Red Index No. 49) | 35 |
| Diglycol mono oleate | 3.5 |

The notations are dry to the touch.

Although specific materials and conditions are set forth in the above exemplary processes in making and using the ink absorptive transparencies of the present invention, these are merely intended as illustrations of the present invention. Various other absorptive pigments, binder resins, film bases, photoconductive materials and reproduction techniques such as those listed above may be substituted in the examples with similar results.

Additionally, the ink absorptive transparent coatings can be employed in various other applications such as, for example, to form ink receptive packaging films which can be directly printed upon and which are conveniently receptive to rubber stamp ink. Also, the coatings of the present invention can be employed to form ink receptive pressure sensitive adhesive labeling tape which can be wrapped with adhesive interleaves. Moreover, these coatings can be employed to form ink receptive printed transparencies, such as educational overhead transparencies, to which notations can be conveniently and directly added in ink.

Other modifications of the present invention will occur to those skilled in the art upon a reading of the present disclosure. These are intended to be included within the scope of this invention.

What is claimed is:

1. An ink absorptive transparency comprising a transparent film base having coated thereon a transparent photoconductive layer, and top coated with a transparent lacquer film, said lacquer film comprising a resin binder pigmented with an inorganic ink absorptive pigment exhibiting substantially the same refractive index as that of the binder.

2. An ink absorptive transparency comprising a transpaernt film base having coated thereon a transparent lacquer film, said lacquer film comprising a resinous binder pigmented with an inorganic ink absorptive pigment and a photoconductive material, each exhibiting substantially the same refractive index as that of the binder, said photoconductive material being present in an amount sufficient to render said transparency photoconductive.

3. An ink absorptive transparency as defined in claim 2 wherein the ink absorptive pigment is a member selected from the group consisting of hydrated magnesium silicate, silica aerogel and barium sulfate.

4. An ink absorptive transparency comprising a transparent film base having coated thereon a transparent lacquer film, said lacquer film comprising a substantially transparent photoconductive resinous binder pigmented with an inorganic ink absorptive pigment exhibiting substantially the same refractive index as that of the binder.

5. An ink absorptive transparency comprising a transparent film base containing a transparent photoconductive material, said film base having coated thereon a transparent lacquer film said lacquer film comprising a resin binder pigmented with an ink absorbent pigment exhibiting substantially the same refractive index as that of the binder.

References Cited

UNITED STATES PATENTS

| 2,053,494 | 9/1936 | Pirie et al. | 117—37 L X |
| 3,097,964 | 7/1963 | Stowell | 117—155 |
| 3,634,135 | 1/1972 | Akiyama | 96—1.5 X |
| 3,148,064 | 9/1964 | Rauner | 96—91 |

GEORGE F. LESMES, Primary Examiner

M. B. WITTENBERG, Assistant Examiner

U.S. Cl. X.R.

117—201, 204, 1.7, 161; 252—62.1